United States Patent [19]

Dixon

[11] 4,148,389
[45] Apr. 10, 1979

[54] APPARATUS FOR FEEDING AND ORIENTING SCREWS

[75] Inventor: Paul H. Dixon, Belvidere, Ill.

[73] Assignee: Dixon Automatic Tool, Inc., Rockford, Ill.

[21] Appl. No.: 789,150

[22] Filed: Apr. 20, 1977

[51] Int. Cl.² .......................................... B65G 47/24
[52] U.S. Cl. ................................. 198/389; 198/631; 221/160; 221/165
[58] Field of Search .............. 198/389, 396, 397, 494, 198/626, 627, 631, 817, 840, 384, 835, 844, 846, 847; 221/159, 160, 165; 271/221; 74/231 R, 231 C, 231 P, 231 CB; 209/428

[56] References Cited

U.S. PATENT DOCUMENTS

| | | | |
|---|---|---|---|
| 2,054,247 | 9/1936 | Dilger et al. | 198/384 |
| 2,252,498 | 8/1941 | Flaws | 198/389 |
| 2,873,841 | 2/1959 | Smith | 198/389 |
| 3,346,095 | 10/1967 | Dixon | 198/389 |
| 3,517,797 | 6/1970 | Daleffe et al. | 198/389 |
| 3,538,994 | 11/1970 | Olden | 198/631 |
| 3,583,547 | 6/1971 | Dixon | 198/388 |
| 3,923,299 | 12/1975 | Taylor et al. | 271/221 |
| 3,951,304 | 4/1976 | Heinz et al. | 198/626 |
| 4,023,673 | 5/1977 | Hansen | 198/494 |

*Primary Examiner*—Joseph E. Valenza
*Attorney, Agent, or Firm*—Leydig, Voit, Osann, Mayer & Holt, Ltd.

[57] ABSTRACT

Randomly oriented screws are deposited onto two horizontally spaced endless belts and are advanced toward a track located adjacent the ends of the upper runs of the belts. As the screws are advanced, the belts are vibrated vertically to shake the screws to properly oriented positions in which the screws hang by their necks from the belts with their shanks located between the belts. Vibration of the belts is effected by means of lugs formed on the inner sides of the belts and operable to flex the belts upwardly and downwardly as the lugs pass across pulleys which support and guide the belts. Also disclosed is a clearing wheel for flinging any improperly oriented fasteners from the track, the clearing wheel being constructed from a series of face-to-face discs made of comparatively soft urethane or the like.

6 Claims, 9 Drawing Figures

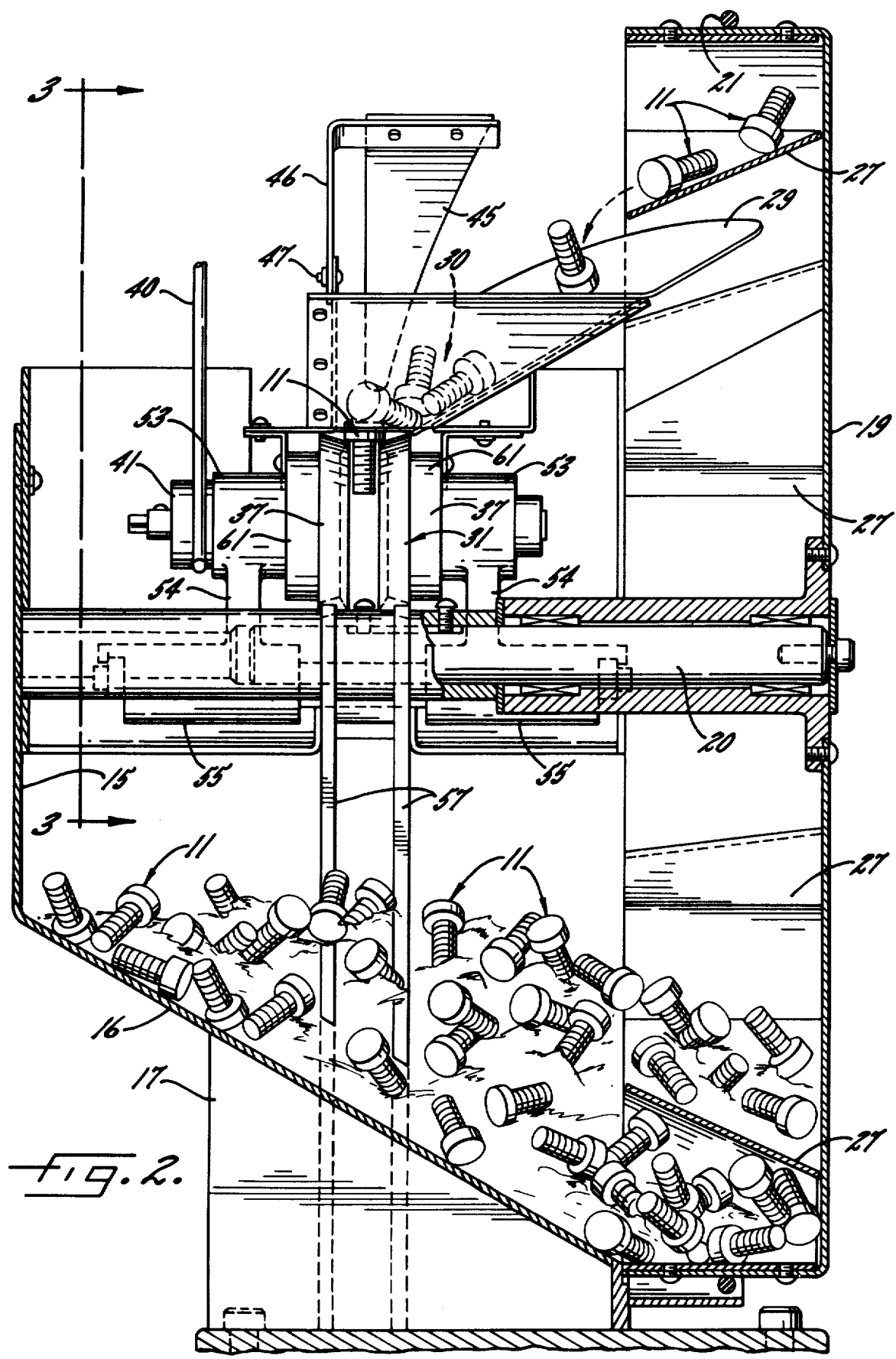

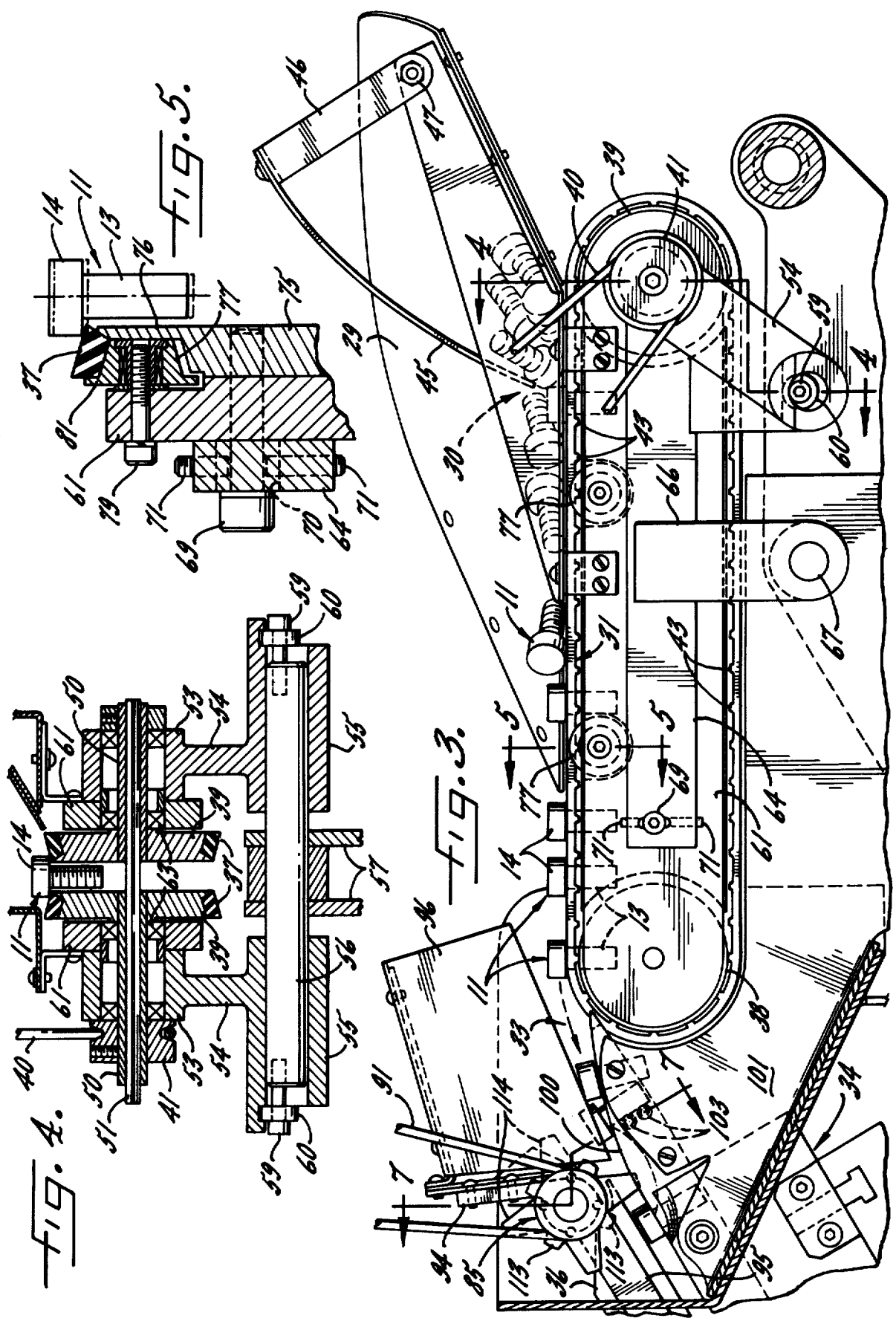

APPARATUS FOR FEEDING AND ORIENTING SCREWS

BACKGROUND OF THE INVENTION

This invention relates to apparatus for feeding fasteners such as screws to an automatic assembly machine or the like and for orienting the screws into proper positions as the screws are fed and before the screws reach the machine.

One type of a feeding and orienting apparatus is disclosed in Dixon U.S. Pat. No. 3,583,547 and includes a bowl which is vibrated to cause randomly oriented screws to move out of the bowl and toward the assembly machine, the vibration causing the screws to assume properly oriented positions as the screws move out of the bowl. Once the screws have moved out of the bowl, they are delivered to a downwardly inclined track and are supplied to the assembly machine. A rotatable clearing wheel is mounted above the track and includes radially projecting fingers which engage the screws the fling any misoriented screws from the track while also causing the screws to proceed properly down the track.

Another type of vibratory feeding apparatus is disclosed in Dixon U.S. Pat. No. 3,346,095 and includes a track which is vibrated back and forth to cause the screws to move along the track.

SUMMARY OF THE INVENTION

The primary aim of the present invention is to provide new and improved vibratory apparatus for feeding and orienting screws or other fasteners, the apparatus being much more quieter in operation than prior vibratory apparatus and being more easily adaptable to handle screws of different sizes and types.

A more detailed object is to achieve the foregoing by providing apparatus in which the screws to be fed are delivered onto a pair of side-by-side endless belts which are adapted to be advanced to feed the screws and which are adapted to be vibrated in a unique manner to shake the screws into properly oriented upright positions in which the heads of the screws hang from the belts with the shanks of the screws disposed between the belts.

Still another object is provide feeding and orienting apparatus in which the belts are vibrated in an extremely simple manner by virtue of the lower sides of the belts being formed with novel lugs which cause the belts to vibrate vertically as the lugs pass around rollers which support the belts.

The invention also resides in making the belts transversely adjustable so as to enable the belts to be easily adjusted to feed screws of different types and sizes.

Another object of the invention is to provide a relatively simple and inexpensive clearing wheel which engages the screws on the track with a "soft" action to reduce noise and to avoid damage to the screws.

Still another object is to provide a clearing wheel which may be uniquely constructed for use with screws of different types and sizes.

These and other objects and advantages of the invention will become more apparent from the following detailed description when taken in conjunction with the accompanying drawings.

BRIEF DESCRIPTION OF THE DRAWINGS

FIG. 2 is an enlarged fragmentary cross-section taken substantially along the line 2—2 of FIG. 1.

FIG. 3 is a fragmentary cross-section taken substantially along the line 3—3 of FIG. 2.

FIG. 4 is a fragmentary cross-section taken substantially along the line 4—4 of FIG. 3.

FIG. 5 is an enlarged fragmentary cross-section taken substantially along the line 5—5 of FIG. 3.

DETAILED DESCRIPTION OF THE PREFERRED EMBODIMENT

Figure 1:
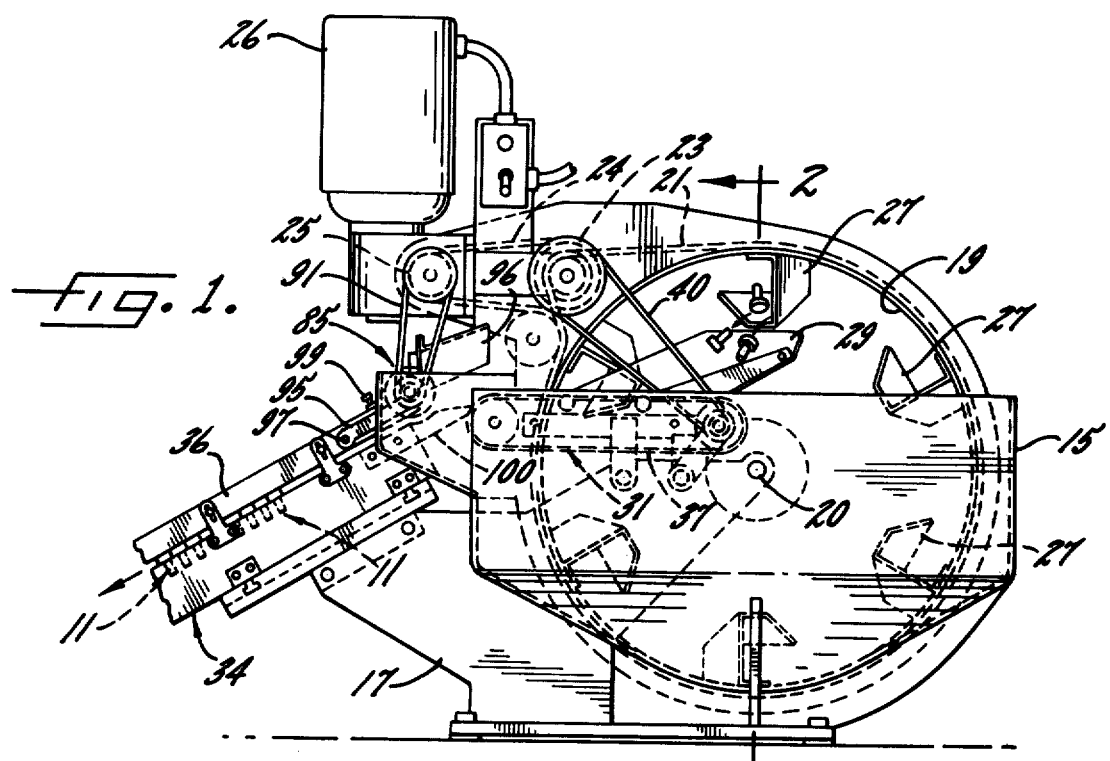
FIG. 1 is a fragmentary side elevational view of new and improved apparatus incorporating the unique features of the present invention.

As shown in the drawings for purposes of illustration, the invention is embodied in apparatus 10 for orienting fasteners 11 (FIG. 2)—such as screws each having an elongated shank 13 and an enlarged head 14—and for feeding the fasteners to an automatic assembly machine (not shown) which is adapted to drive the fasteners into a workpiece. A typical automatic assembly machine with which the present apparatus may be used is disclosed in Dixon U.S. Pat. No. 3,675,302.

In the present instance, the screws 11 initially are stored in a hopper 15 (FIG. 2) having an open top and having a downwardly inclined bottom wall 16, the hopper being supported on a base 17. One side of the hopper is closed by an open-sided drum 19 adapted to rotate in a counterclockwise direction (FIG. 1) about a stationary horizontal shaft 20 (FIG. 2) which laterally spans the hopper. The drum is driven by a belt 21 (FIG. 1) wrapped around the exterior of the drum and trained around a pulley 23 which, in turn, is ganged with another pulley drivenly connected by a belt 24 to still another pulley 25 adapted to be driven by an electric motor 26.

Screws 11 in the hopper 15 gravitate downwardly along the inclined bottom wall 16 thereof and enter into the open side of the drum 19. As the drum rotates, batches of screws which enter the drum are picked up by angularly spaced scoops 27 (FIGS. 1 and 2) secured to the inside of the drum. When each scoop is rotated upwardly to approximately a twelve o'clock position, the screws spill out of the scoop, fall into a stationarily mounted guide chute 29 and then are directed to the supply station 30 (FIG. 3) of a conveyor 31. The latter advances the screws from right to left to a discharge station 33 where the screws are guided single file onto a downwardly inclined track 34 (FIG. 1) defined by a pair of laterally spaced rails. The screws entering the track hang by their heads 14 from the rails—with their shanks 13 located between the rails—and gravitate down the track to the automatic assembly machine. A stationary bar 36 (FIG. 1) overlies and is centered between the rails and engages the heads of the screws to hold the screws on the track.

In accordance with the present invention, the conveyor 31 is formed by two resiliently flexible endless belts 37 (FIGS. 2 and 3) disposed in horizontally spaced side-by-side relation and uniquely adapted to vibrate the screws 11 and orient the screws into upright positions as the screws are advanced to the track 34 by the belts. As a result of the vibrating belts, the advancing screws are oriented with a vibratory action but without nearly the level of noise which is produced by other vibratory feeders such as, for example, vibratory bowl feeders.

More specifically, each belt 37 is made from an extremely resiliently flexible material such as urethane and each is trained and stretched around a front roller or pulley 38 (FIG. 3) and a longitudinally alined rear roller or pulley 39 (FIGS. 3 and 4). Herein, separate transversely alined front pulleys 38 and separate transversely alined rear pulleys 39 are provided for the two belts although, in certain instances, a single grooved roller could serve as the front pulley for both belts while a similar roller could serve as the back pulley for both belts.

The front and rear pulleys 38 and 39 are supported such that each of the two belts 37 includes a generally horizontal active or upper run extending between and above the two pulleys. Each belt then curves downwardly around its front pulley 38, extends horizontally between the lower sides of its pulleys 38, 39 and then curves upwardly around the rear pulley 39. Also—and in keeping with the invention—the pulleys are supported such that the lateral horizontal spacing between the belts is less than the diameter of the head 14 of each screw 11 but is greater than the diameter of the screw shank 13. As a result, each properly oriented screw which is advanced by the belts may hang from the latter by its head 14 with the shank 13 of the screw located between the belts (see FIG. 4).

Driving of the belts 37 to advance the screws 11 forwardly from the supply station 30 to the discharge station 33 is effected by a belt 40 (FIGS. 1 and 3) trained around a pulley which is ganged with the pulley 23 and around a pulley 41 (FIGS. 3 and 4) which is ganged with one of the rear pulleys 39. When the motor 26 is energized to rotate the drum 19, the belts 37 are driven from right to left (FIG. 3) and advance toward the track 34 those screws which were dumped onto the belts from the chute 29.

In carrying out the invention, the belts 37 are vibrated vertically as they advance the screws 11 from the supply station 30 to the discharge station 33 and, as a result of such vibration, the randomly oriented screws deposited onto the belts by the chute 29 are either thrown off the belts and back into the hopper 15 or are shaken to properly oriented positions in which the screws hang from the belts for delivery to the track 34. Because the belts are made of urethane, the vibration of the screws results in very little noise.

To vibrate the belts 37, lugs 43 (FIGS. 6a and 6b) coact between the belts and the pulleys 38 and 39 and serve to flex the belts upwardly and downwardly in a fast rythmic manner to impart vibration to the belts. The lugs 43 are formed integrally with and depend from the inner sides of the belts 37. As the belts travel around the upper sides of the pulleys, each lug 43 reaches a point where it is tangent to or on the high side of the pulley around which the belt is traveling (see FIG. 6a). As a result, the belt is flexed upwardly. The lug then passes off of the tangency point before the next lug reaches that point and thus the belt springs downwardly by virtue of its own resilience (see FIG. 6b). As the next lug 43 first reaches and then passes the tangency point, the belt again is flexed upwardly and allowed to spring downwardly. Accordingly, the belts are vibrated at a high frequency and cause some of the misoriented screws to fall back into the hopper 15 while causing other ones of the screws to assume properly oriented upright positions in which the screws hang from the belts. To facilitate movement of the screws to their properly oriented positions, the peripheral surfaces of the pulleys 38 and 39 are inclined such that the upper surfaces of the upper runs of the belts 37 slope downwardly upon progressing inwardly and thus the upper surfaces of the two belts converge downwardly toward one another as shown in FIG. 4.

In order to reduce the number of screws 11 which might stand on their heads 14 on the belts 37 and which thus are likely to be thrown back to the hopper 15, a resiliently flexible finger 45 (FIGS. 2 and 3) extends downwardly and engages the screws as the latter are dumped from the chute 29 and onto the belts. The finger kicks over any screws which might be in an inverted standing position and causes such screws to lie on their sides on the belts. The finger is carried on the upper end of an arm 46 whose lower end is connected to the rear portion of the chute 29 by a fastener 47 which may be released to enable the arm to be pivoted to different positions and thereby change the location of the free end of the finger in accordance with the type and size of screws being handled.

Advantageously, the two belts 37 are supported so as to enable quick and easy adjustment of the lateral spacing of the belts and thereby permit the belts to be positioned to handle screws 11 of different types and sizes. As shown in FIG. 4, each of the two rear pulleys 39 for the belts is supported on a tubular bushing 50, the drive pulley 41 being secured to one of the bushings. The two bushings, in turn, are non-rotatably telescoped over a hexagonal drive transmitting shaft 51 which is journaled by a pair of tubular bosses 53 located at the upper ends of inclined arms 54 (FIGS. 3 and 4). Two additional tubular bosses 55 (FIG. 4) are located at the lower ends of the arms 54 and are mounted slidably on a horizontal rod 56 which is supported in a stationary position by a pair of straps 57 extending upwardly from the base 17. A screw 59 is threaded into each end of the rod 56 and carries a collar 60 which fits into a groove formed in the end portion of the adjacent boss 55. By adjusting the two screws, the bosses 55 may be shifted inwardly toward one another thereby to decrease the spacing between the two rear pulleys 39 and to reduce the spacing between the belts 37. The bushings 50 and the shaft 51 permit the two rear pulleys 39 to be adjusted while maintaining a rotational drive from the drive pulley 41 to both rear pulleys.

The spacing between the two forward pulleys 38 is changed at the same time the rear pulleys 39 are adjusted. For this purpose, the front pulleys are rotatably supported by the forward end portion of a pair of side plates 61 (FIGS. 4 and 5) whose rear end portions are journaled by bearings 63 on the bushings 50 as shown in FIG. 4. The rear end portions of the side plates 61 are sandwiched between the rear pulleys 39 and the upper bosses 53 and thus the side plates and the front pulleys 38 are adjusted laterally whenever the rear pulleys are adjusted.

To enable the forward ends of the belts 37 to be located properly relative to the track 34, the forward pulleys 38 are mounted for vertical adjustment relative to the rear pulleys 39. Herein, the adjustable mounting is accomplished through the use of two arms 64 (one arm being shown in FIG. 3) rigid with and extending forwardly from the upper bosses 53, the arms being braced by two vertical straps 66 having upper ends connected rigidly to the midportions of the arms and having lower ends telescoped slidably and non-rotatably over a laterally extending rod 67 which is secured to the base 17. The arms 64 lie along the outer sides of the plates 61 with each arm being connected to its respective plate by a screw 69 (FIGS. 3 and 5) extending through a vertically elongated slot 70 (FIG. 5) formed in the forward end portion of the arm. Upper and lower set screws 71 are threaded into each arm 64 and bear against the screw 69. When the set screws are adjusted upwardly or downwardly, the forward end portions of the side plates 61 are moved upwardly or downwardly to change the elevation of the forward ends of the belts 37. As the forward end portions of the side plates are adjusted, the rear end portions of the side plates pivot about the bearings 63.

Figure 6A:
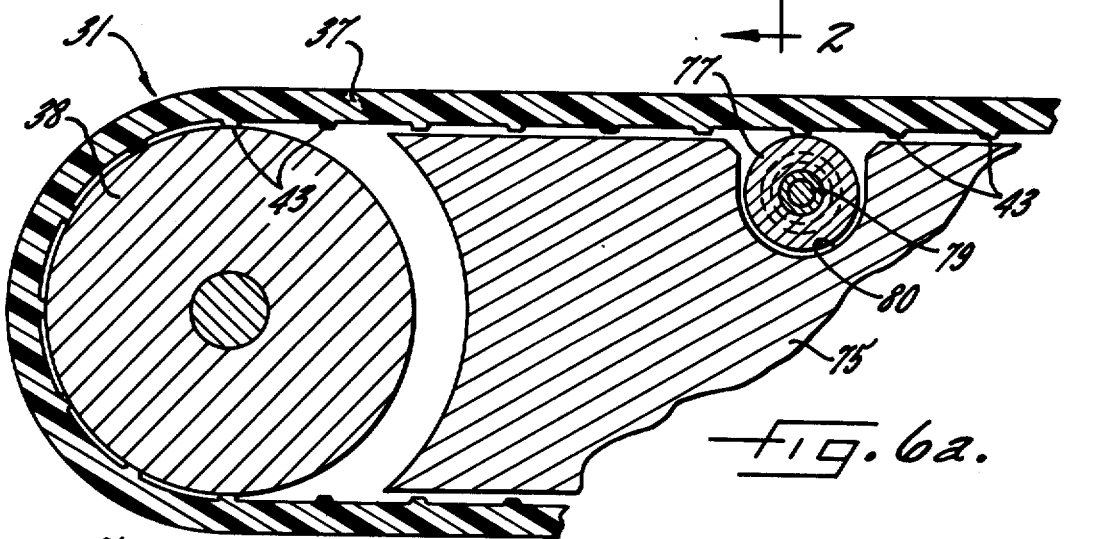
FIGS. 6a and 6b are fragmentary cross-sectional views showing successive positions of one of the vibratory belts.
Figure 6B:
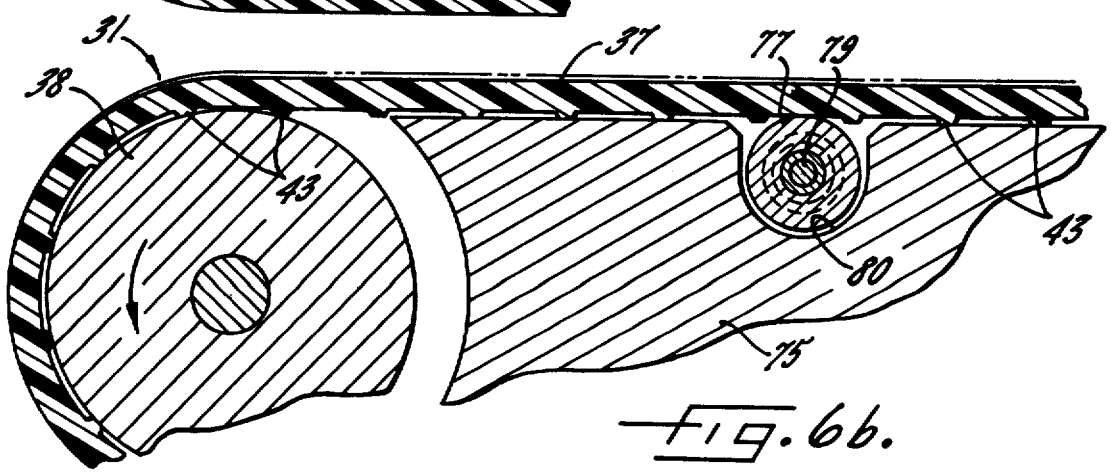

Filler plates 75 (FIGS. 5 and 6a) are located between the side plates 61 to fill up the space beneath each belt 37 and to provide a barrier which limits lateral swinging of the screw shank 13 when the screw 11 is hanging from the belts. One filler plate 75 is attached to the inner side of each side plate 61 by the screw 69 and by additional screws (not shown) and is substantially alined with the front and rear pulleys 38 and 39. The front and rear ends of the filler plates 75 terminate short of the pulleys and are curved substantially in accordance with the curvature of the pulleys as shown in FIG. 6a. As a result of the filler plates, the space within which the screw shank 13 travels is restricted in width and thus the shank is prevented from swinging laterally sufficiently far as to allow the screw head 14 to fall through the gap between the belts 37.

An upwardly projecting flange 76 (FIG. 5) is formed on the inner side of each filler plate 75 and engages the inner side of the adjacent belt 37 to back the belt laterally and thereby prevent the belt from shifting inwardly. Outward shifting of each belt is prevented by a pair of idler wheels 77 (FIGS. 3 and 5) located between the front and rear pulleys 38 and 39 and journaled on screws 79 which extend through the side plates 61, the idler wheels being disposed within notches 80 (FIG. 6a) in the filler plates 75. A radially projecting flange 81 (FIG. 5) is formed around the outer side of each idler wheel and engages the outer side of the belt 37 to keep the belt from moving laterally outwardly. The idler wheels also underlie and support the intermediate portion of the upper run of each belt 37 and prevent the belt from sagging downwardly under the weight of the screws 11.

From the foregoing, it will be apparent that the present invention brings to the art a new and improved apparatus 10 in which the belts 37 are vibrated in a novel manner to effect orientation of the screws 11 as the screws are advanced by the belts. Because the belts are made of relatively soft material, the impacting of the vibrating screws against the belts creates very little noise and thus the apparatus is comparatively quiet in operation. By virtue of the belts being laterally adjustable, the apparatus can easily be changed over to handle screws of different sizes.

The present invention also contemplates the provision of a novel clearing wheel 85 for removing any misoriented screws 11 from the track 34 and for causing the screws to proceed properly down the track, the clearing wheel being characterized by its ability to engage the screws with a "soft" action and without damaging the screws. In addition, the clearing wheel is made from assembled components which enable the wheel to be made up in various different lengths and forms so that the wheel can be constructed for use with many different types and sizes of screws.

Figure 7:
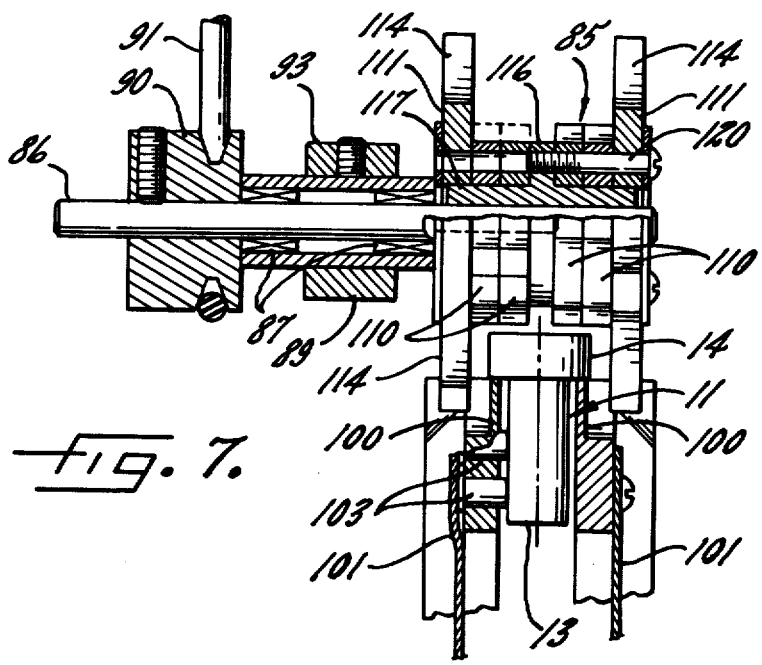
FIG. 7 is an enlarged fragmentary cross-section taken substantially along the line 7—7 of FIG. 3.

In the present instance, the clearing wheel 85 is mounted above the track 34 immediately adjacent the entry end thereof and is adapted to be rotated in a counterclockwise direction (FIG. 3) about a laterally extending horizontal axis. For this purpose, the clearing wheel is secured to a horizontal shaft 86 (FIG. 7) which is supported by bearings 87 within a sleeve 89. A pulley 90 is secured to one end portion of the shaft 86 and is adapted to be rotated by a belt 91 extending downwardly from a pulley which is ganged with the pulley 25 as shown in FIG. 1.

Figure 8:
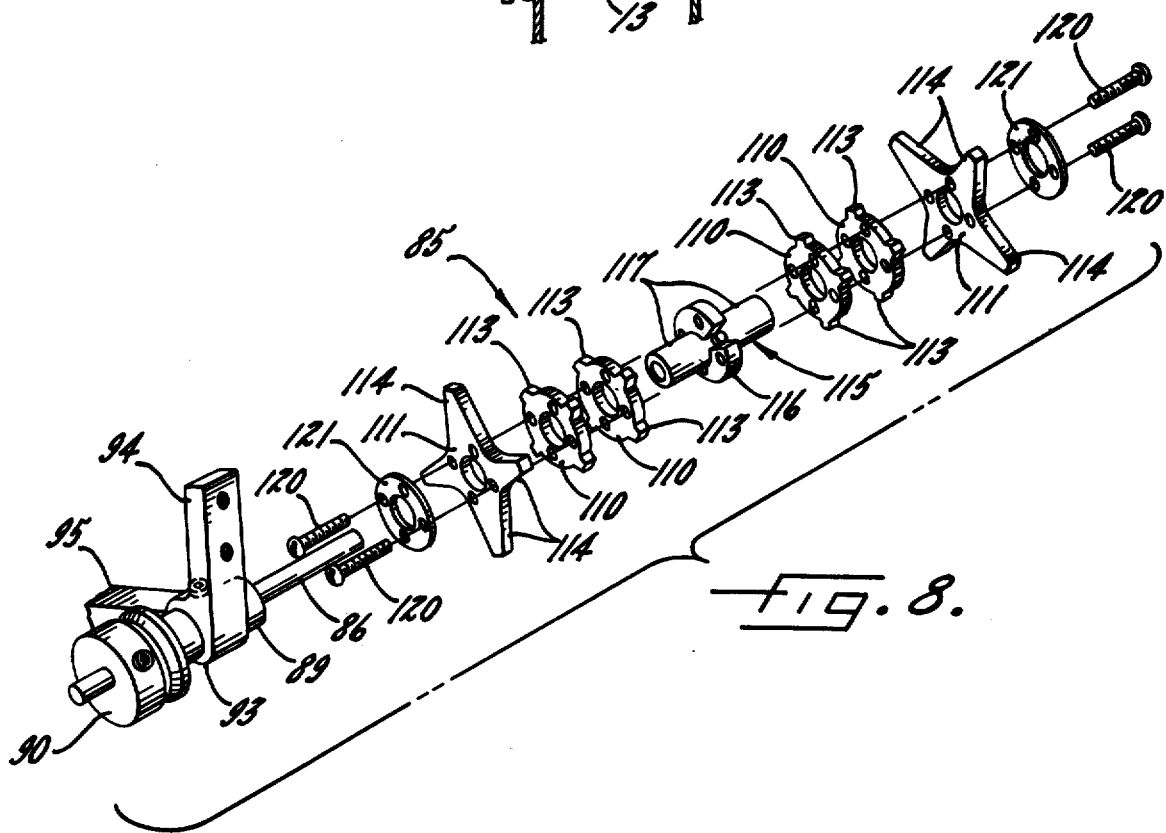
FIG. 8 is an exploded perspective view of the clearing wheel.

The sleeve 89 (FIG. 7) is secured within a tubular boss 93 which is formed integrally with a generally vertical arm 94 (FIG. 8) and a generally horizontal arm 95. A plastic tunnel 96 of inverted U-shaped cross section is secured to the rear side of the vertical arm 94 and acts as a shield to deflect back into the hopper 15 those screws 11 which are flung from the track 34 by the wheel 85 and to prevent such screws from flying outwardly toward the operator of the machine. The forward end portion of the horizontal arm 95 is connected pivotally to the hold down bar 36 of the track 34 to swing upwardly about a horizontal axis 97 (FIG. 1) and normally is held downwardly by a manually releasable latching mechanism indicated generally at 99. When the latching mechanism is released, the arms 94 and 95 and the clearing wheel 85 may be swung counterclockwise about the pivot 97 to raise the wheel from the track 34 and enable the operator to manually clear any abnormally severe jam-up of screws beneath the wheel. As the wheel is raised from the track, the shielding tunnel 96 swings upwardly with the vertical arm 94 to enable the operator to gain better access to the track.

Before describing the detailed construction of the clearing wheel 85, it should be noted that the entry end of the track 34 includes blade-like extensions 100 (FIGS. 3 and 7) which lead to the discharge end of the conveyor 31 and which support and guide the screws 11 as the latter are transferred from the belts 37 to the rails of the track. Plastic skirts 101 are secured to and depend from the extensions and enshroud the gap between the conveyor 31 and the track 34 to prevent screws from flying outwardly through such gap. The upper end portion of one of the skirts presses lightly against two substantially vertically spaced pins 103 (FIG. 7) which are supported by the associated extension 100 and which project inwardly a short distance into the space in which the screw shanks 13 travel as the screws 11 ride along the extensions. The ends of the pins 103 lightly engage each screw shank and slightly retard movement of the shank so as to cause the head 14 of the screw to assume a forwardly tipped position as the screw enters the inclined track 34 and passes beneath the clearing wheel 85. While the screws normally tend to hang vertically from the extensions, the retarding effect of the pins tilts the screws forwardly so that the heads of the screws may duck beneath the clearing wheel.

Pursuant to the invention, the clearing wheel 85 is fabricated from a suitable number of discs 110 and/or discs 111 (FIG. 8) which can be formed and assembled as necessary to provide a wheel of a desired length and shape for the particular size and shape of screws being handled. Herein, the wheel includes four inboard discs 110 disposed in face-to-face relation and stacked between two outboard discs 111. The inboard discs are formed with angularly spaced fingers 113 of relatively short length for kicking properly oriented but slightly elevated screws rearwardly along the extensions 100 so that such screws can rest properly on the extensions before proceeding beneath the wheel and down the track 34. Each of the outboard discs 111 is formed with four angularly spaced and comparatively long fingers 114 which serve to fling away any screws which might extend crosswise of the track 34.

The discs 110 and 111 are supported by a hub 115 (FIG. 8) which is defined by a radially projecting flange 116 formed integrally with a sleeve having two tubular shaft portions 117 projecting in opposite directions from the flange, the sleeve being telescoped over and secured to the drive shaft 86 for the clearing wheel 85. Two inboard discs 110 and one outboard disc 111 are telescoped over each of the shaft portions 117 and each is formed with angularly spaced holes which are alined with tapped holes formed through the flange 116. Each set of three discs is secured to the flange 116 by means of two screws 120 extending through the holes in the discs and threaded into the holes in the flange, there being a washer 121 located on the outboard side of each outboard disc 111.

With the foregoing arrangement, the discs 110 and 111 can be assembled in any manner that might be desired in order to construct a clearing wheel 85 of appropriate length and characteristics. That is, a fewer or greater number of discs 110 may be used to reduce or increase the length of the wheel or the length may be varied by using discs 110 and 111 of different thicknesses. Also, the discs 110 and 111 can be shifted angularly relative to one another to change the angular relationship of the fingers 113 and 114 or discs with fingers of different shapes and lengths may be used in place of the discs 110 and 111. Because the wheel is fabricated from individually formed discs, various types of wheels can be constructed at a much lower cost than is required to make custom wheels by the usual technique of casting and machining the wheel from a single piece of metal.

Importantly, the discs 110 and 111 of the clearing wheel 85 are made of a comparatively soft plastic-like material such as urethane. As a result, the discs 111 fling the screws 11 from the track 34 with a soft action and without high impact velocity. Thus, the discs 111 are "kind" to the screws so as to avoid damage to the screws and also to reduce noise. In addition, the fingers 113 of the discs 111 can yield to allow just slightly elevated screws to pass beneath the wheel and to allow passage of any screw which might have a burr on its head 114, and which might otherwise be removed from the track 34 by a wheel with rigid metal fingers.

I claim:

1. Apparatus for feeding and orienting fasteners each having an elongated shank with an enlarged head on one end thereof, said apparatus comprising a pair of endless belts each made of resiliently flexible material and each having an active run extending in a generally horizontal direction, substantially smooth rollers supporting and guiding said belts with each belt curving vertically around a roller at each end of the active run of the belt, said belts being disposed in side-by-side relation and being spaced horizontally from one another by a distance greater than the diameter of the fastener shanks and less than the diameter of the fastener heads whereby a fastener deposited onto the active runs of said belts may assume an oriented position in which the fastener hangs by its head from said active runs with the shank of the fastener located between the belts, means for depositing randomly oriented fasteners onto the active runs of said belts at a supply station, means for driving the active runs of said belts in a direction to advance said fasteners from said supply station to a discharge station, and means coacting between said rollers and said active runs for vibrating said active runs in a substantially vertical direction thereby to shake said randomly oriented fasteners into said oriented positions as said fasteners are advanced to said discharge station, said last-mentioned means comprising lugs spaced along and formed integrally with said belts, said lugs being operable to engage said rollers and flex the active runs of said belts vertically as said lugs pass around said rollers.

2. Apparatus as defined in claim 1 in which the active runs of said belts curve downwardly around said rollers and in which said fasteners are deposited onto the upper sides of said active runs, said lugs being spaced along the lower sides of said active runs.

3. Apparatus for feeding and orienting fasteners each having an elongated shank with an enlarged head on one end thereof, said apparatus comprising substantially smooth rollers spaced generally longitudinally from one another, a pair of endless belts made of resiliently flexible material and trained around said rollers, each belt including an upper run extending in a generally horizontal direction between said rollers with each belt curving downwardly around a roller at each end of said upper run, said belts being disposed in side-by-side relation and being spaced transversely from one another by a distance greater than the diameter of the fastener shanks and less than the diameter of the fastener heads whereby a fastener deposited onto the upper runs of said belts may assume an oriented position in which the fastener hangs by its head from said upper runs with the shank of the fastener located between said belts, means for depositing randomly oriented fasteners onto the upper sides of the upper runs of said belts at a supply station, means for driving the upper runs of said belts in a direction to advance said fasteners from said supply station to a discharge station, and downwardly projecting lugs formed integrally with and spaced along the lower side of the upper run of each belt and operable to ride across said rollers and vibrate said upper runs in a substantially vertical direction thereby to shake said randomly oriented fasteners into said oriented positions as said fasteners are advanced to said discharge station.

4. Apparatus as defined in claim 3 in which the surfaces of said rollers are inclined and cause the upper side of each upper run to slope downwardly and inwardly whereby said upper sides converge toward one another upon progressing downwardly.

5. Apparatus as defined in claim 3 further including idler wheels located between the ends of said upper runs and supporting the lower sides of said upper runs, said idler wheels having radially projecting flanges supporting the outer sides of said upper runs.

6. Apparatus as defined in claim 3 in which said rollers comprise two transversely alined forward pulleys and two transversely alined rear pulleys alined longitudinally with said forward pulleys, one of said belts being trained around one of said forward pulleys and around the longitudinally alined rear pulley, the other of said belts being trained around the other of said forward and rear pulleys, said driving means being operable to rotate one of said pulleys, drive transmitting means for establishing a rotational drive from the latter pulley to the transversely alined pulley, and means supporting one of said forward pulleys and the longitudinally alined rear pulley for transverse adjustment relative to the other forward and rear pulleys to enable adjustment of the transverse spacing between said belts, said drive transmitting means maintaining said rotational drive when said pulleys are adjusted transversely.

* * * * *